(12) United States Patent
Mesnier et al.

(10) Patent No.: US 7,527,240 B2
(45) Date of Patent: May 5, 2009

(54) FLOW CONTROL DEVICE, WITH ASSISTED ANCHORING, INSERTABLE INTO A PIPELINE

(75) Inventors: Luc Mesnier, Fresnes sur Marne (FR); Amine Dalibey, Vitry sur Seine (FR)

(73) Assignee: Gaz de France, Paris (FR)

( * ) Notice: Subject to any disclaimer, the term of this patent is extended or adjusted under 35 U.S.C. 154(b) by 337 days.

(21) Appl. No.: 11/392,841

(22) Filed: Mar. 29, 2006

(65) Prior Publication Data
US 2006/0237074 A1 Oct. 26, 2006

(30) Foreign Application Priority Data
Mar. 31, 2005 (FR) .................................. 05 03167

(51) Int. Cl.
*F16K 51/00* (2006.01)
(52) U.S. Cl. ...................................... 251/143; 137/507
(58) Field of Classification Search ................. 137/846, 137/844, 843, 315.01, 15.19, 315.33, 507; 251/147, 142, 143
See application file for complete search history.

(56) References Cited

U.S. PATENT DOCUMENTS

| | | | | |
|---|---|---|---|---|
| 3,112,795 A * | 12/1963 | Keithahn | ..................... | 166/120 |
| 4,291,727 A * | 9/1981 | Yie et al. | ....................... | 138/93 |
| 4,366,862 A * | 1/1983 | Brandell | ...................... | 166/106 |
| 5,662,671 A * | 9/1997 | Barbut et al. | ................. | 606/170 |
| 6,053,210 A * | 4/2000 | Chapman et al. | .............. | 138/46 |
| 6,328,072 B1 | 12/2001 | Mahe et al. | | |
| 6,962,165 B2 | 11/2005 | Delprat et al. | | |
| 7,011,094 B2 * | 3/2006 | Rapacki et al. | ......... | 128/207.15 |
| 2005/0251175 A1 * | 11/2005 | Weisenburgh et al. | ........ | 606/153 |

* cited by examiner

*Primary Examiner*—John Rivell
*Assistant Examiner*—Macade Brown
(74) *Attorney, Agent, or Firm*—Harness, Dickey & Pierce, PLC

(57) ABSTRACT

The invention relates to a flow control device which is insertable into a fluid pipeline (K) and comprising a valve (1), an obturator with membrane (2), and anchoring flaps (3) that can deploy like umbrella spokes under the action of an elastic stress until it presses against the wall (P) of the pipeline (K). According to the invention, the membrane (2) and the flaps (3) are mutually attached to and disposed on a same side of the valve body (10), so that as the flaps (3) deploy the membrane (2) deploys at the same time until the membrane presses against the internal wall of the pipeline (K) and the fluid exerts on the deployed membrane a pressure which increases the pressure of the flaps (3) against this wall (P).

7 Claims, 3 Drawing Sheets

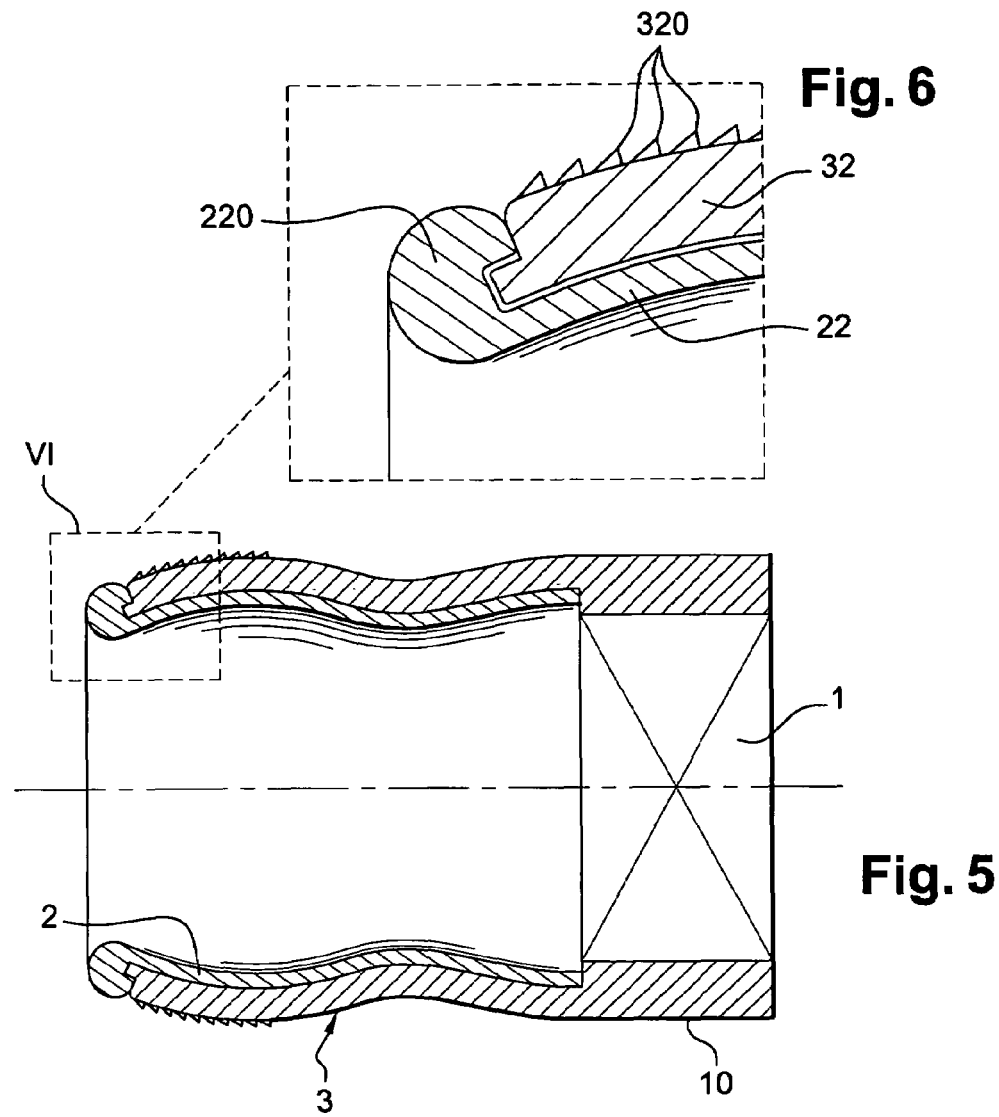
Fig. 6
Fig. 5
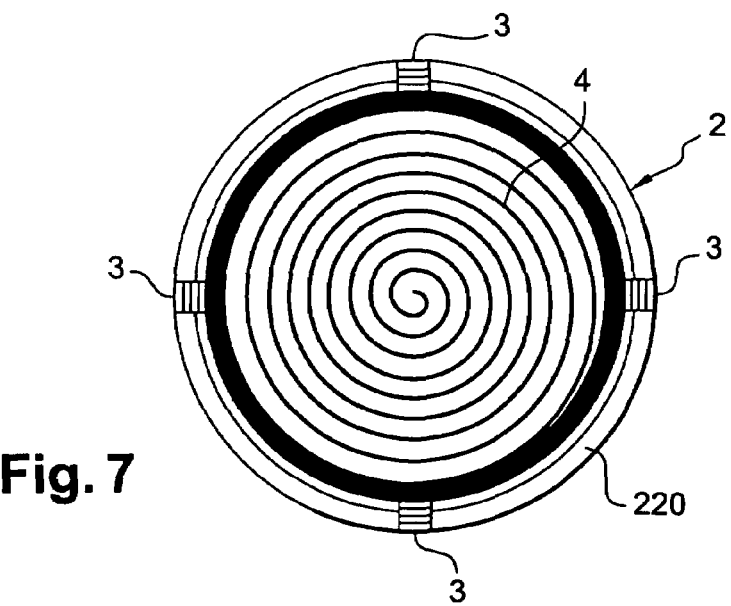
Fig. 7

FLOW CONTROL DEVICE, WITH ASSISTED ANCHORING, INSERTABLE INTO A PIPELINE

FIELD OF THE INVENTION

The invention generally relates to techniques for operating pipeline networks, and in particular gas pipelines.

BACKGROUND OF THE INVENTION

More precisely, the invention relates to a flow control device that is inserted, during operation, into a pipeline in which a fluid, for example a gaseous fluid, is flowing from upstream to downstream, this device comprising at least one safety or stop valve having a body with an upstream side and a downstream side, an annular obturator with a deformable tubular membrane, and anchoring means integral with the valve body and which are used to secure it, while in operation, in the pipeline, the valve being used to stop, at least selectively, a central fluid vein delimited at the center of the pipeline, the membrane being able to deploy radially to channel the fluid toward the central vein, and the anchoring means comprising a plurality of flaps, each having one linked end, fixed in position in relation to the valve body, and one free end, moving in relation to the valve body, these flaps deploying radially like umbrella spokes under the action of an elastic stress until their free ends press against the internal wall of the pipeline.

A device of this type is described in particular in patent application EP 1 388 697.

This patent application, which was submitted by the same applicant, advocates the use of flaps pressed against the internal wall of the pipeline by means of their own elasticity, under the effect of which the flaps deploy.

Although it has undeniable qualities, this known device has only been shown to provide, under certain circumstances, a blocking force that is insufficient to resist the fluid pressure without risk of migration inside the pipeline.

SUMMARY OF THE INVENTION

In this context, the aim of the invention is to propose a device that can be inserted into a pipeline and kept in place there, even under difficult conditions and without damaging said pipeline.

To this end, the device according to the invention, moreover in compliance with the generic definition given in the preamble above, is essentially characterized in that the membrane is attached to the flaps and has a linked edge by which this membrane is connected in a tight fashion to the valve body, and a free edge disposed upstream of the linked edge opposite the free ends of the flaps, and in that when the flaps deploy, the membrane deploys at the same time by expansion of its free edge, until this free edge presses against the internal wall of the pipeline, the fluid exerting on the deployed membrane a pressure which increases the pressure of the free ends of the flaps against the internal wall of the pipeline.

As a result of this layout, the fluid pressure acts on the membrane in a direction so as to increase the pressure of the flaps against the internal wall of the pipeline, the force maintaining the device in the pipeline being thus an increasing function of the pressure.

Preferably, the free edge of the membrane has a band that is pressed against the internal wall of the pipeline while in operation.

Although the flaps may be articulated by their linked ends, they may also be made of a flexible material and, for example, be connected to the valve body by their linked ends.

To increase the friction force of the flaps in the pipeline, these flaps may have, on their free ends, ridges forming retaining claws.

The device according to the invention may also comprise a cone- or spiral-shaped spring disposed so as to apply said elastic stress.

Preferably, the membrane and the flaps are disposed on the upstream side of the valve body.

BRIEF DESCRIPTION OF THE DRAWINGS

Other characteristics and advantages of the invention will become clear from the description which is given below, as an indicative and non-limiting example, with reference to the attached drawings, in which:

FIG. 5 is a schematic sectional view of the device illustrated in FIG. 1, shown in its folded state;

FIG. 6 is a magnified view of the detail indicated by reference VI of FIG. 5; and FIG. 7 is an end view of the device shown in FIG. 5.

DETAILED DESCRIPTION OF THE PREFERRED EMBODIMENTS

As stated above, the invention relates to a flow control device intended, during operation, to be inserted into a pipeline K in which a fluid, for example a gas, is flowing from upstream X− to downstream X+.

This device comprises a safety or stop valve 1, an obturator with membrane 2, and anchoring means 3.

Figure 2:
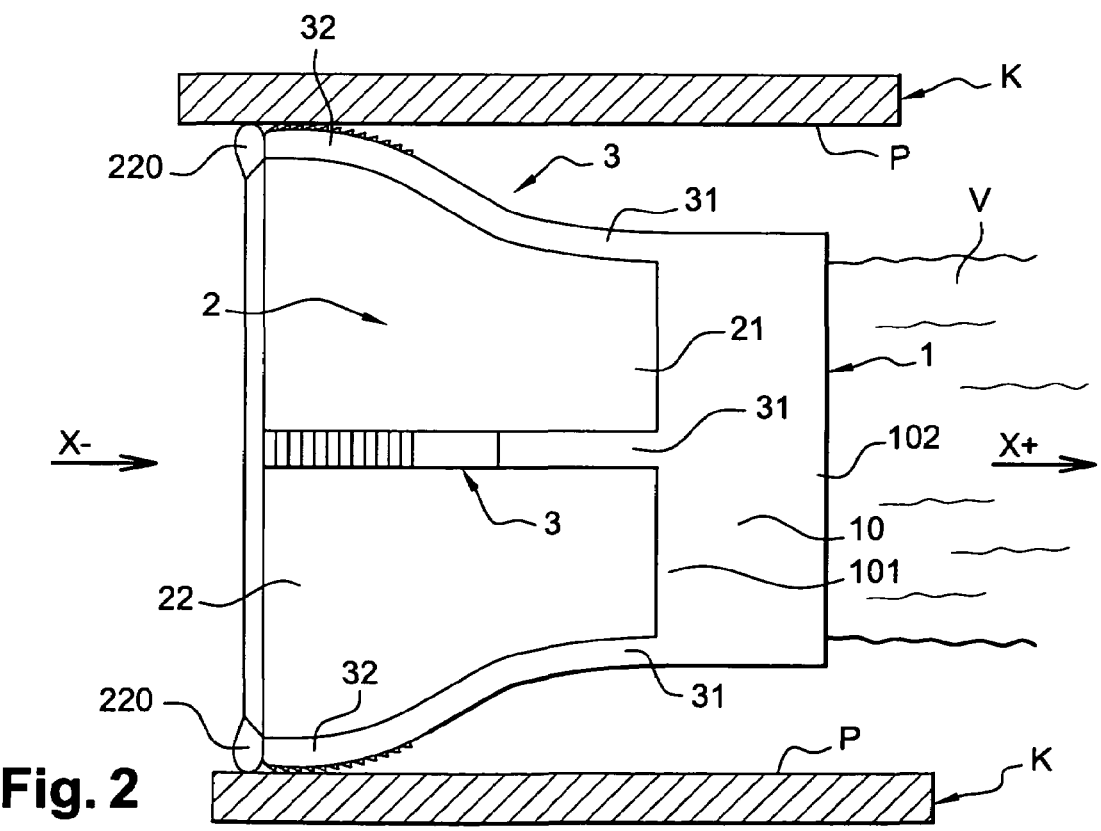
FIG. 2 is a schematic side view of the device illustrated in FIG. 1, shown deployed in the pipeline after being ejected from the constriction sleeve.

The function of the valve 1, whose specific internal structure has not been shown and does not belong to the invention, is to stop, at least under certain predetermined conditions, a central fluid vein V delimited in the center of the pipeline K (FIG. 2).

To the extent that it can fulfill its function, this valve may have any structure and may in particular have any shape known to a person skilled in the art, for example either of the shapes described in patent documents EP 1 059 481 and EP 1 388 697.

This valve has a body 10 with an upstream side 101 and a downstream side 102, these sides being turned, while in operation, upstream X− and downstream X+ of the fluid flow respectively.

The obturator with membrane has an annular shape and is composed of a deformable tubular membrane 2 that can deploy radially to channel the fluid toward the central vein V, that is, to block the circulation of fluid at the periphery of the body 10 of the valve 1.

The anchoring means 3, which are attached to the valve body 10 and which are used to secure it while in operation in the pipeline K, are composed of a plurality of flaps 3.

Each flap 3 has a linked end 31 which is fixed in position in relation to the valve body 10, and a free end 32 which is moving in relation to the valve body 10.

The flaps 3 are continuously subjected to an elastic stress so that, while in operation, they deploy radially like umbrella spokes until their free ends 32 press against the internal wall P of the pipeline K.

Figure 1:
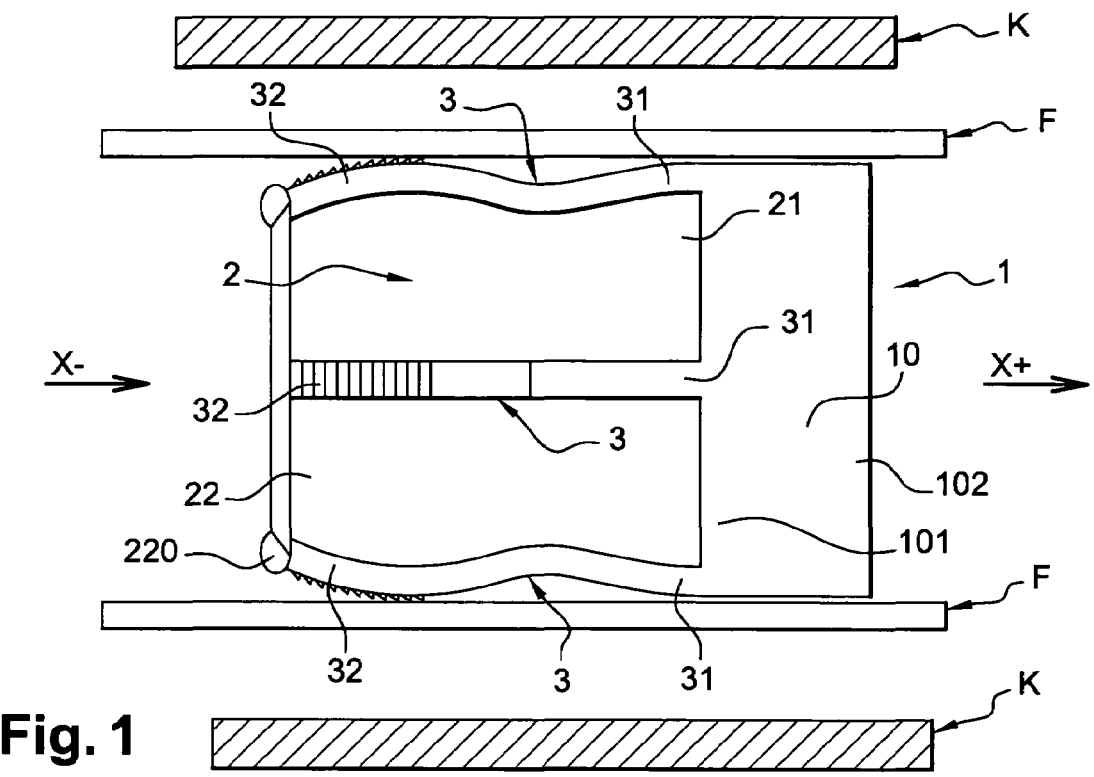
FIG. 1 is a schematic side view of a device according to the invention, shown folded in a constriction sleeve, itself inserted into a pipeline.

In practice, the device may initially (FIG. 1) be kept in a sleeve F while it is inserted into the pipeline K, the flaps 3 being in a folded position at that time.

Once in place in the pipeline K, the device may be ejected from the sleeve F by any known means, the flaps 3 then deploying, as illustrated in FIG. 2, under the action of the elastic stress they receive.

According to the invention, the membrane 2 is attached to the flaps 3 and has a linked edge 21 and a free edge 22.

Preferably, the membrane 2 and the flaps 3 are disposed on the upstream side 101 of the valve body 10.

The membrane 2 is connected in a watertight fashion to the valve body 10 by its linked edge 21, while the free edge 22 of this membrane is disposed upstream of the linked edge 21 and adjacent to the free ends 32 of the flaps 3.

Under these conditions, the movements of the free edge 22 of the membrane follow the movements of the free ends 32 of the flaps 3, the membrane 2 thus deploying by expansion of its free edge 22 at the same time as the flaps 3 deploy, until this free edge presses against the internal wall P of the pipeline K.

As a result of this layout, the fluid exerts on the deployed membrane 2 a pressure which increases the pressure of the free ends 32 of the flaps 3 against the internal wall P of the pipeline K.

Figure 3:
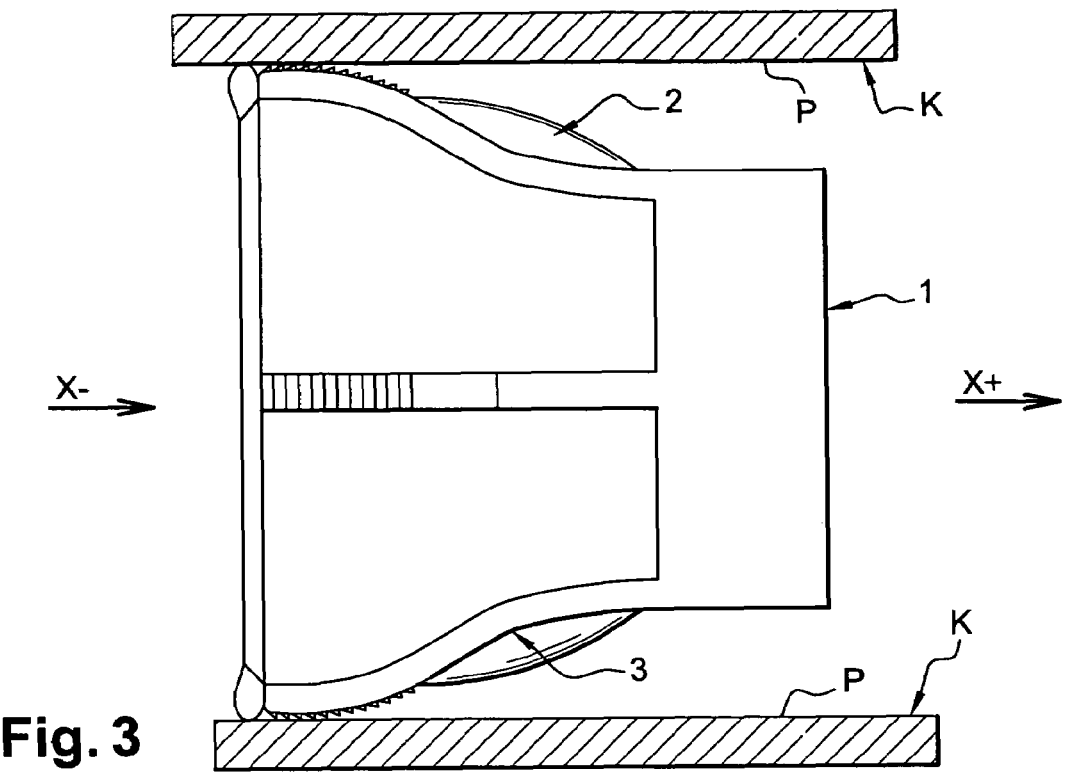
FIG. 3 is a schematic side view of the device illustrated in FIG. 2, shown in an initial state of membrane inflation.
Figure 4:
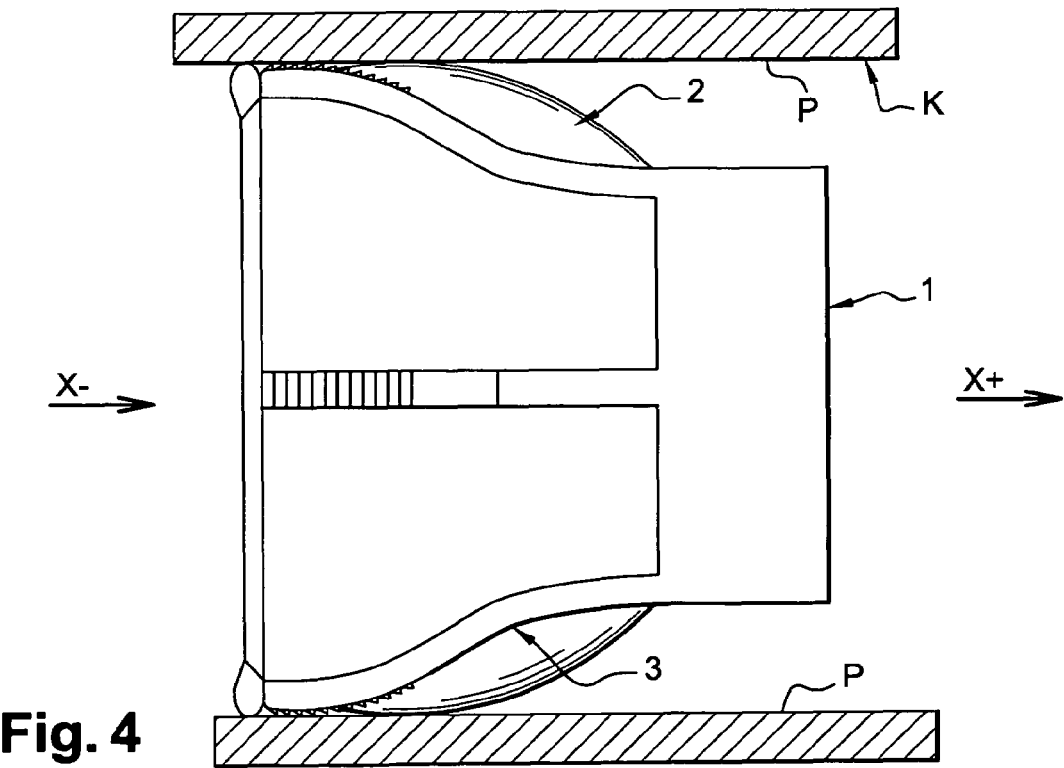
FIG. 4 is a schematic side view of the device illustrated in FIGS. 2 and 3, shown in an advanced state of membrane inflation.

In the event where the valve 1 is activated, that is, in the event where the central fluid vein V is stopped, the membrane 2 may inflate (FIGS. 3 and 4) at the level of the areas of its surface which extend between two adjacent flaps 3, and thus itself press against the wall P in order to help to keep the device in the pipeline K.

The free edge 22 of the membrane advantageously has a roll band 220, which is pressed while in operation against the internal wall P of the pipeline K.

The flaps 3 are connected, by their linked ends 31, to the upstream side 101 of the valve body 10 and may therefore be composed of the same material as the latter.

To avoid having to provide the free ends 32 of the flaps 3 with articulations, the latter may be made of a flexible material.

Moreover, these flaps 3 may have, on their free ends 32, ridges 320 forming retaining claws and increasing the adhesion of the flaps on the internal wall P of the pipeline K.

Finally, the device may comprise a spring 4 (FIG. 7), in a cone or spiral shape, and disposed in the membrane, remote from its linked edge 21, in order to apply on the flaps the elastic stress which enables them to deploy.

The invention claimed is:

1. A flow control device inserted, into a pipeline in which a fluid is flowing from upstream to downstream, this device comprising:
    a valve with a body having an upstream side and a downstream side, the valve selectively opens and closes, when the valve is open, the valve allows the fluid to flow through the valve and to flow in a central fluid vein delimited at a center of the pipeline, when the valve is closed, the valve prevents the fluid from flowing through the valve to stop the central fluid vein;
    an annular obturator with an inflatable, deformable tubular membrane, and anchoring means integral with the valve body and used to secure it, the anchoring means comprising a plurality of flaps, each of which has a linked end secured to the valve body, and a free end distal of the valve body, the flaps deploying radially until the free ends of the flaps press against the internal wall of the pipeline,
    wherein the membrane is attached to the flaps and has a linked edge connected to the valve body, and a free edge disposed upstream of the linked edge and adjacent to the free ends of the flaps, and as the flaps deploy, the membrane deploys at the same time by expanding the free edge, until the free edge presses against the internal wall of the pipeline, and
    wherein when the valve is closed, the fluid that is blocked by the valve inflates the membrane and exerts on the deployed membrane a pressure that increases the pressure of the free ends of the flaps against the internal wall of the pipeline.

2. The device according to claim 1, characterized in that the free edge of the membrane has a roll band that is pressed against the internal wall of the pipeline while in operation.

3. The device according to claim 1, characterized in that the flaps are made of a flexible material.

4. The device according to claim 3, characterized in that the flaps are connected to the valve body by their linked ends.

5. The device according to claim 3, characterized in that the flaps have, on their free ends, ridges forming retaining claws.

6. The device according to claim 1, characterized in that it comprises a cone or spiral-shaped spring disposed so as to apply elastic stress.

7. The device according to claim 1, characterized in that the membrane and the flaps are disposed on the upstream side of the valve body.

* * * * *